No. 740,955. Patented October 6, 1903.

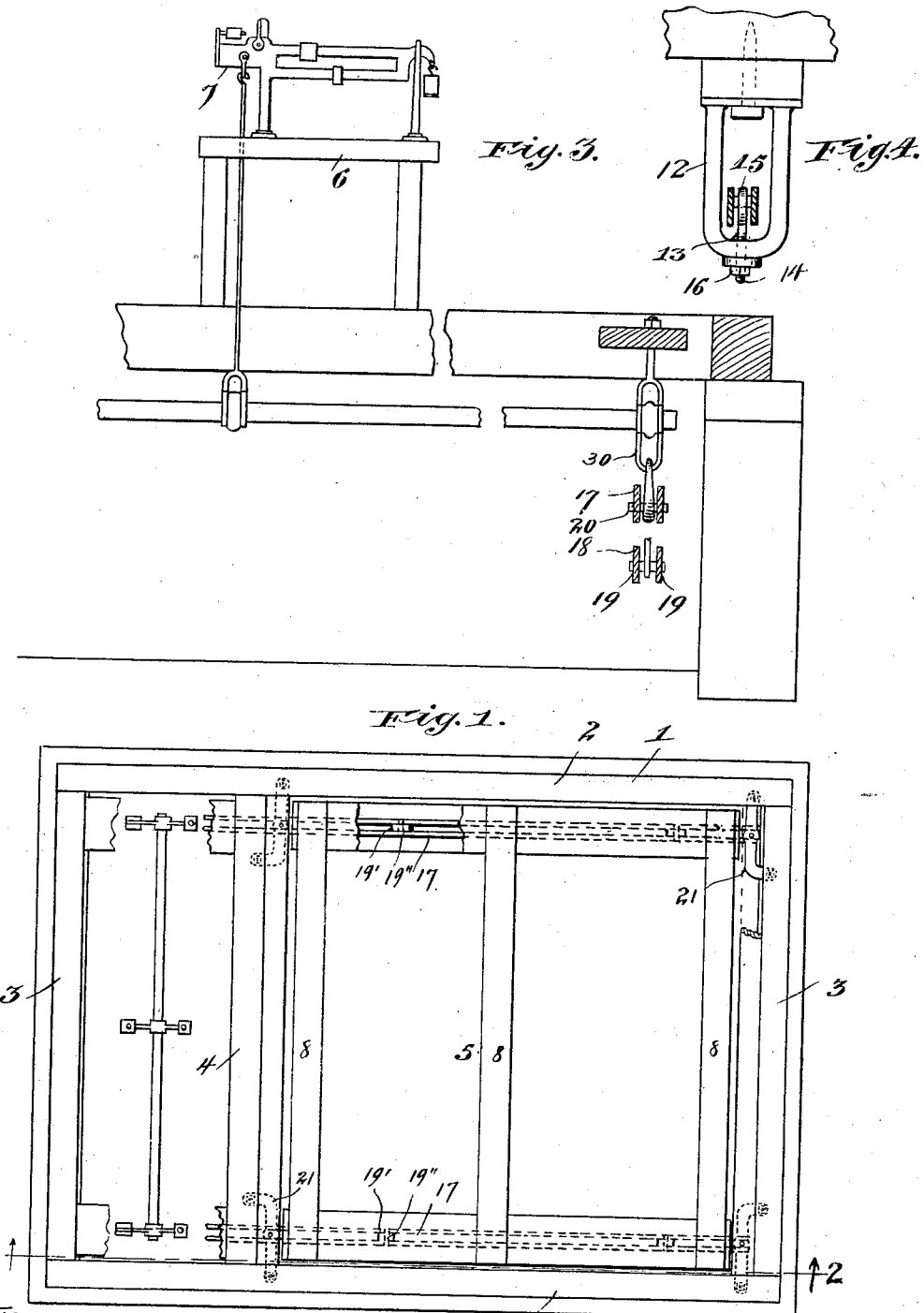

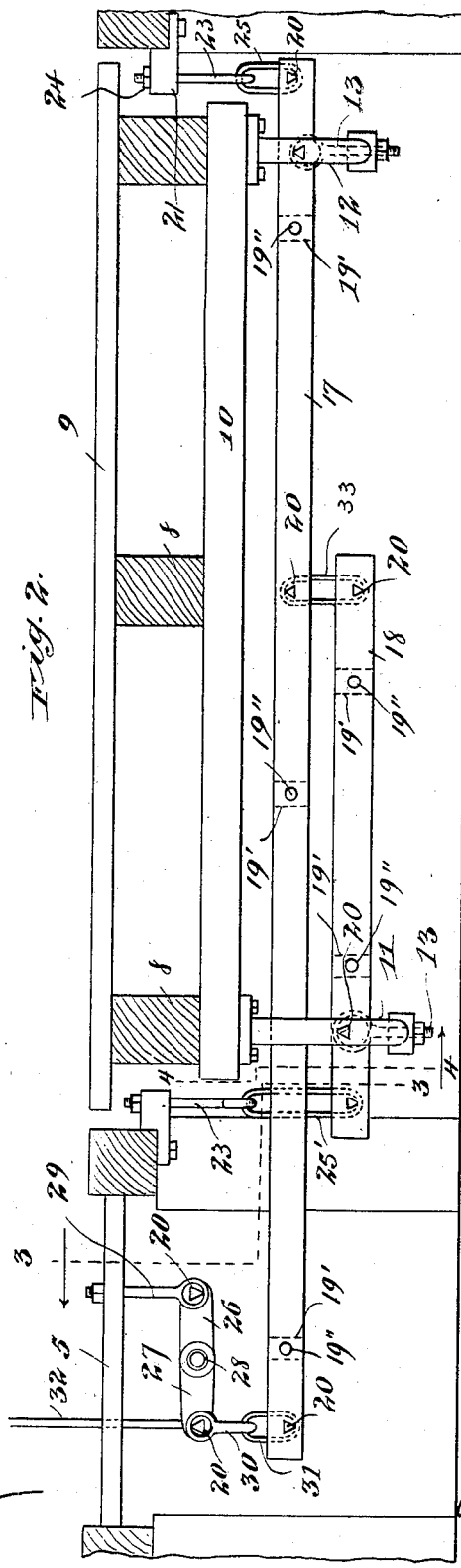

UNITED STATES PATENT OFFICE.

CARROLL H. VINCENT, OF MOLINE, ILLINOIS.

PLATFORM-SCALE.

SPECIFICATION forming part of Letters Patent No. 740,955, dated October 6, 1903.

Application filed July 22, 1901. Serial No. 69,232. (No model.)

*To all whom it may concern:*

Be it known that I, CARROLL H. VINCENT, a citizen of the United States, residing at Moline, Illinois, have invented certain new and useful Improvements in Platform-Scales, of which the following is a specification.

This invention relates to improvements in scales, and refers more specifically to a scale of that type commonly known as "platform-scales," although the invention is not necessarily confined to embodiment in platform-scales, but is well adapted for embodiment in other types, such as hopper and dump scales.

Among the salient objects of the invention are to provide a scale of extremely simple and cheap construction and having the parts so arranged as to avoid the necessity of long beams and likewise to avoid extending the beams under the central part of the weight-carrying structure or frame; to provide an improved form of structure in the beams whereby the weighing-frame is supported and the weight transmitted to the scale mechanism which affords a maximum degree of strength and rigidity with a given weight of material, enables the knife-bearings to be mounted upon the beams in a most economical and at the same time highly efficient manner, and facilitates an arrangement whereby perfect equilibrium of stress upon the beams is secured; to provide an improved construction and arrangement in which the vibration of the platform is necessarily at right angles to the direction of the knife-bearings, or, in other words, an arrangement in which the knife-bearings are all parallel with each other throughout the entire structure, thereby reducing to a minimum the weight upon the bearings and likewise rendering the scale more sensitive and acute as well as less susceptible to injury; to provide a structure in which the weight-carrying frame or platform is suspended entirely by means of freely-swinging links, likewise contributing to the freedom of movement and sensitiveness of the scale; to provide a structure which may be increased in size without necessitating change of arrangement and at the same time without increasing the length of any of the operating-beams beyond practical dimensions, and in general to provide an improved construction of the character referred to.

The invention consists in the matters hereinafter described, and more particularly pointed out in the appended claims, and the same will be readily understood from the following description, reference being had to the accompanying drawings, in which—

Figure 1 is a plan view of a scale embodying my invention, the stationary platform upon which the scale-beam is mounted being broken away to expose the arrangement of the scale connections beneath and the flooring of the load-supporting platform being likewise omitted to disclose the arrangement of subjacent parts. Fig. 2 is a transverse vertical sectional view taken on line 2 2 of Fig. 1 and looking in the direction of the arrows, the lower portion of the connecting-rod which transmits the weight to the scale-beam being shown, but the scale-beam and superstructure supporting the same being omitted in order to reduce the size of the figure. Fig. 3 is a longitudinal vertical sectional view taken on line 3 3 of Fig. 2 and looking in the direction of the arrows, parts only of the structure being shown in order to reduce the size of the figure. Fig. 4 is a similar longitudinal vertical sectional view taken on line 4 4 of Fig. 2 and looking in the direction of the arrows.

Referring to the drawings, 1 designates as a whole the main outer stationary frame of the structure, comprising the transverse or end beams 2 2, the side beams 3 3, and an intermediate longitudinal beam 4, it being understood that this general frame may be varied as required. The intermediate longitudinal frame member 4 divides the main frame into two rectangular portions, within one of which is mounted the platform (designated as a whole 5) and upon the other of which is mounted the stationary platform 5, which supports the upright frame, (designated as a whole 6,) which carries the weighing-beam mechanism, (designated as a whole 7,) all of these features being of common and well-known construction, and therefore requiring no details of description herein.

The suspended or weighing platform 5 is, as usual, constructed of a plurality of parallel joists 8, across the upper sides of which the flooring 9 is secured, the platform thus constructed being carried in the present instance by a pair of transverse lower end frame members 10.

At each of the four corners of the main platform arranged upon the under side thereof, so as to project downwardly within the scale-pit, is a carrying-yoke, of which the pair at that side adjacent to the stationary platform is designated 11 and the pair of the opposite side 12. The yokes 11 and 12, as best shown in detail, Fig. 4, are U-shaped, their upper ends being bolted to the under side of the platform, while at their lower ends they are provided with centrally-disposed vertical carrying-links 13, each consisting of a stem or body portion 14, inserted through a corresponding aperture formed through the lower end of the yoke, and an eye or ring portion 15, arranged to engage a knife-edge bearing, as hereinafter described.

The carrying-links 13 are conveniently secured in their respective yokes by means of nuts 16, threaded upon their lower ends, as indicated clearly in the drawings.

17 17 and 18 18 designate the lever-beams, whereby the weight of the load is transmitted from the platform to the weighing-beam. These beams are of peculiar construction and constitute one of the important features of the invention. Each comprises a pair of relatively wide and thin or plate-like members 19 19, secured together in parallel relation and at a short distance apart and with their flatwise planes arranged vertically, a plurality of space-blocks 19' being to this end interposed between said bars at intervals apart and the parts secured together by means of through-bolts 19''.

20 designates the knife-edge bearings, which are made in the form of through-bars of suitable cross-sectional shape and arranged to extend entirely through both members of the duplex lever-beam, as best indicated in Fig. 3. It will be understood, of course, that additional space-blocks may be provided at points between those indicated, if desired, to afford greater rigidity to the beams; but in scales of ordinary dimensions such additional space-blocks will be found unnecessary.

The longer pair of lever-beams 17 are each supported at one end from the side of the frame structure remote from the weighing-beam platform and extended thence beneath the load-supporting platform and to a point vertically beneath the weighing-beam, as indicated clearly in Fig. 2, said lever-beams being so located as to extend through the upper portions of the corresponding yokes 11 and 12 at the respective ends of the structure. As a preferred means of supporting those ends of said lever-beams 17 remote from the scale-beam L-shaped brackets 21 are bolted to the under sides of the stationary end and side frame members 2 and 3, respectively, at the angle formed at the junction of these members, the central portions of the castings being arranged to overhang the pit, within which the platform is suspended.

23 designates suspension eyebolts or links arranged to extend through the several brackets 21 and secured thereto by nuts 24, to the lower end of which eyebolt 23 is attached a link 25, which extends downwardly between the parallel members 19 of the corresponding beam and around the knife-bearing 20 thereof, the knife-bearing at this end of said beam 17 having its edge suspended downwardly, so as to be carried by the suspension-links 25. At their opposite ends said lever-beams 17 are connected with an oscillatory frame, designated as a whole 26 and comprising a series of transverse parallel bars or levers 27, three in the present instance, rigidly united with each other by means of a central longitudinally-extending bar 28, desirably and as shown herein of tubular construction, and to which the several lever members 27 are rigidly united.

The several lever members 27 of the oscillator-frame 26 are pivotally supported at one end by means of eyebolts or suspension-links 29, secured to and extending downwardly from the stationary platform structure, each eyebolt being bifurcated or provided with two links arranged to embrace the opposite sides of the end of the lever and engage both ends of the knife-bearing 20, extending through the end of the lever, and by means of which the lever is pivotally supported within the links. At their opposite or swinging ends the levers 27 are provided with similar knife-edge bearings, arranged, however, in reverse relation to those engaging the links 29, and with these bearings are connected clevis-shaped supporting-links 30, which in turn support suspension-links 31, extending downwardly between the members of the beams 17 and engaging the knife-edge bearings 20 thereof in substantially the same manner as do the links 25 at the opposite end. With the swinging end of the oscillatory frame 26 is connected the vertical tension-rod 32, which transmits the weight to the scale-beam mechanism 7. In the preferred construction the tension-rod 32 is likewise forked or provided with double links, which embrace opposite sides of one of the levers 27, desirably the central one of the three, which is provided with knife-edge bearings directed downwardly and engaging the lower sides of the links of the tension-rod, the tension-rod thus serving to support the downward pull of the pair of levers 17, acting through the medium of the oscillatory frame 26. That edge of the load-supporting platform remote from the scale-beam is suspended directly from the base of the lever-beams 17 by means of yokes 12, as hereinbefore fully described. The opposite side of the load-supporting platform is, however, supported through intermediate mechanism, as follows: The links 25', which are connected with the suspension or eye bolts 23 at that side of the load-supporting platform adjacent to the scale-beam, are made sufficiently longer than the links 25 to extend downwardly through and beyond the beams 17 and support at their lower ends the corresponding ends of the pair of short lever-beams 18, the latter being provided with knife-bearings 20 to engage said links in the same manner as do those of the upper pair of lever-beams. The opposite ends of the lever 18 are connected with the respective lever-beams 17 at points intermediate of the length of the latter by means of tension-links 33, engaging knife-bearings 20 upon the respective beams, as shown clearly in Fig. 2. The carrying-yokes 11 at this side of the load-supporting platform are likewise made of sufficient length to extend downwardly and embrace both levers 17 and 18, the yokes being carried by connection with the levers 18 by having their eyebolts 13 engaged with knife-edge bearings 20, carried by the levers 18 at points intermediate of the length of the latter. The result of this arrangement is that the right-hand side of the weight-carrying platform is carried by the pair of lever-beams 17, while the opposite side of the load-carrying platform is carried by the shorter lever-beams 18, which in turn transmit the load to the lever-beams 17 through the links 33.

The construction of the weighing-beam mechanism may obviously be of any usual type, and inasmuch as the details of construction of this feature form no part of the invention they will not be described herein.

It will be seen from the foregoing description that the load-carrying platform is suspended entirely by means of swinging links and upon knife-edge bearings, all of which are arranged in parallel relation—i. e., to extend longitudinally of the platform, so that the platform is free to vibrate laterally with a maximum weight upon the knife-edge bearings. It will further be noted that each pair of the lever-beams is arranged so that they are vertically above each other and are supported so as to bring a perfect equilibrium of stress upon opposite sides of the members, thereby avoiding all torsional strain upon the lever-arms. Likewise the oscillatory frame, which transmits the leverage to the scale-beam, is so constructed as to be subject to an equally-balanced stress, thereby reducing to a minimum the error incident to the transmission of the weight from the platform to the weighing-beam. It will be further noted that the lever-beams are relatively short, the longer beams being only equal to the width of the platform plus the distance to which they extend beneath the weighing-beam platform. In the case of a platform-scale like that described herein the length may be increased to any reasonable extent found necessary by simply increasing the number of sets of lever-beams and corresponding oscillatory frame members. The construction and arrangement is peculiarly well adapted for embodiment in hopper-scales by reason of the fact that the load-transmitting lever-beams are arranged entirely at the ends, and the central portion of the pit is entirely unobstructed by the operative mechanism of the scales and may therefore be occupied by a hopper arranged in a well-understood manner.

While I have herein shown and described what I deem to be a preferred embodiment of my invention, yet, as hereinbefore intimated, the details of construction may be modified without departing from the spirit of the invention, and I do not, therefore, wish to be limited to the details of construction shown except to the extent that the same are made the subject of specific claims.

I claim as my invention—

1. In a platform or analogous scale, the combination with the load-carrying platform and the stationary frame structure, of pairs of carrying-yokes secured to said platform in transverse alinement with each other, lever-beams, each suspended from the stationary frame structure at one side of the load-carrying platform and extending thence through the corresponding pair of carrying-yokes to and beneath a weighing-beam mechanism located at the opposite side of said platform, an oscillatory frame pivotally supported below said weighing-beam mechanism, with the swinging portion of which oscillatory frame said lever-beams are operatively connected, other shorter lever-beams arranged vertically beneath corresponding ones of said first lever-beams, each supported at one end from the stationary frame structure at the side of the load-carrying platform adjacent to the weighing-beam mechanism and operatively connected at its opposite end with the superjacent lever-beam at a point intermediate the length of the latter, carrying connections directly connecting the yokes at one side of the load-carrying platform with the longer lever-beams, carrying connections directly connecting the yokes at the opposite side of said platform with the shorter lever-beams at points intermediate the length of the latter and operative connections between the said oscillatory frame and the weighing-beam mechanism; said lever-beams being of duplex construction and having bearings formed by bars arranged to extend across the duplex members, whereby an equilibrium of stress is secured, substantially as described.

2. In a platform or analogous scale, the combination with the load-carrying platform and the stationary frame structure, of pairs of carrying-yokes secured to said platform in transverse alinement with each other, lever-beams, each suspended from the stationary frame structure at one side of the load-carrying platform and extending thence through the corresponding pair of carrying-yokes to and beneath a weighing-beam mechanism located at the opposite side of said platform, an oscillatory frame pivotally supported below said weighing-beam mechanism, with the swinging portion of which oscillatory frame said lever-beams are operatively connected, other shorter lever-beams arranged vertically beneath corresponding ones of said first lever-beams, each supported at one end from the stationary frame structure at the side of the load-carrying platform adjacent to the weighing-beam mechanism and operatively connected at its opposite end with the superjacent lever-beam at a point intermediate the length of the latter, carrying connections directly connecting the yokes at one side of the load-carrying platform with the longer lever-beams, carrying connections directly connecting the yokes at the opposite side of said platform with the shorter lever-beams at points intermediate the length of the latter and operative connections between the said oscillatory frame and the weighing-beam mechanism, the supporting connections between the frame structure and the several lever-beams of the platform being all formed by swinging link-engaging knife-edge bearings upon the lever-beams, and said knife-edge bearings thus engaged being all arranged parallel, whereby wear and frictional resistance to vibration of the platform are reduced to a minimum.

3. In a platform-scale, the combination of a U-shaped carrying-yoke, a lever-beam of duplex construction arranged to extend through said yoke, and means for operatively connecting the yoke and lever-beam, comprising a knife-edge bearing extending across and between the members of the duplex beam, and a carrying-link provided with a stem inserted through the closed end of the yoke, and provided at its inserted end with an adjusting-nut and at its opposite end with an eye engaging said knife-edge bearing between the duplex members of the beam, whereby the weight carried by the yoke is transmitted to the lever-beam without torsional stress upon any of the members, and the carrying-link may be adjusted relatively to the knife-edge, substantially as described.

4. In a platform-scale, the combination with the load-carrying platform and the stationary surrounding frame structure, of pairs of carrying-yokes secured to said platform at opposite sides thereof and in transverse alinement with each other, lever-beams, each swingingly suspended from the stationary frame structure at one side of the load-carrying platform and extending thence through the corresponding pair of carrying-yokes of the platform transversely to, and beneath a weighing-beam mechanism located at the opposite side of said platform, other shorter lever-beams arranged vertically beneath and in symmetrically-disposed relation to corresponding ones of said first lever-beams, each shorter beam swingingly supported at one end from the stationary frame structure at the side of the load-carrying platform adjacent to the weighing-beam mechanism and operatively connected at its opposite end with the superjacent lever-beam at a point intermediate the length of the latter, carrying connections directly connecting the yokes at one side of the load-carrying platform with the longer lever-beams, carrying connections directly connecting the yokes at the opposite side of said platform with the shorter lever-beams at points intermediate the length of the latter, and operative connections between the extended ends of the longer levers and the weighing-beam mechanism.

5. In a platform-scale, the combination with the load-carrying platform and the stationary surrounding frame structure, of pairs of carrying-yokes secured to said platform at opposite sides thereof and in transverse alinement with each other, lever-beams, each swingingly suspended from the stationary frame structure at one side of the load-carrying platform and extending thence through the corresponding pair of yokes carrying the platform transversely to, and beneath a weighing-beam mechanism located at the opposite side of said platform, other shorter lever-beams arranged vertically beneath and in symmetrically-disposed relation to corresponding ones of said first lever-beams, each shorter beam swingingly supported at one end from the stationary frame structure at the side of the load-carrying platform adjacent to the weighing-beam mechanism and operatively connected at its opposite end with the superjacent lever-beam at a point intermediate the length of the latter, carrying connections directly connecting the yokes at one side of the load-carrying platform with the longer lever-beams, carrying connections directly connecting the yokes at the opposite side of said platform with the shorter lever-beams at points intermediate the length of the latter, and operative connections between the extended ends of the longer levers and the weighing-beam mechanism, comprising a rigid skeleton frame connecting the extended ends of the longer lever-beams beneath the weighing-beam mechanism, and a link connecting said rigid skeleton frame with the scale-beam.

CARROLL H. VINCENT.

Witnesses:
JOHN A. KITTILSEN,
RENVILLE E. CRANE.